United States Patent [19]

Gielnik

[11] 4,192,040

[45] Mar. 11, 1980

[54] APPARATUS FOR CUTTING OPEN AND CLEANING THE STOMACHS OF SMALL ANIMALS, FOR EXAMPLE POULTRY

[75] Inventor: Harry Gielnik, Bremen, Fed. Rep. of Germany

[73] Assignee: Münchmeyer & Co., Hamburg, Fed. Rep. of Germany

[21] Appl. No.: 946,558

[22] Filed: Sep. 28, 1978

[30] Foreign Application Priority Data

Oct. 3, 1977 [DE] Fed. Rep. of Germany ....... 2744456

[51] Int. Cl.² ............................................. A22C 21/06
[52] U.S. Cl. ............................................ 17/11; 17/58
[58] Field of Search ...................................... 17/58, 11

[56] References Cited

U.S. PATENT DOCUMENTS

| | | | |
|---|---|---|---|
| 1,103,809 | 7/1914 | Mischler | 17/58 |
| 1,331,932 | 2/1920 | Kloster | 17/58 |
| 1,819,060 | 8/1931 | Baader | 17/58 X |

*Primary Examiner*—Willie G. Abercrombie
*Attorney, Agent, or Firm*—H. Dale Palmatier

[57] ABSTRACT

Apparatus for cutting open and cleaning the stomachs of small animals such as poultry comprises a conveying wheel, which has around its periphery chambers for holding said stomachs, means for feeding said stomachs to said chambers, a knife which extends into the path of movement of said chambers for cutting open said stomachs and a device for cleaning said stomachs after they have been cut open. Said wheel includes means for decreasing and increasing the sizes of said chambers as the wheel rotates, said chambers decreasing in size as they move away from said feeding means towards said knife whereby said stomachs are compressed in said chambers as they reach said knife. Divider means is provided downstream of said knife in the direction of movement of said chambers for prizing open said stomachs and removing hard skin from within said stomachs. To enable the chambers to be decreased and increased in size, the wheel preferably comprises three discs arranged face to face and driven at the same speed as each other. The two outer discs are rotated about a common axis and the middle disc is rotated about an axis which is eccentric to the common axis so that the periphery of the middle disc forms a radially inner wall of the chambers which moves radially inwards and outwards.

7 Claims, 5 Drawing Figures

APPARATUS FOR CUTTING OPEN AND CLEANING THE STOMACHS OF SMALL ANIMALS, FOR EXAMPLE POULTRY

This invention relates to apparatus for cutting open and cleaning the stomachs of small animals, especially poultry, the apparatus comprising a conveying wheel, which has around its periphery chambers for holding the stomachs, a knife which extends into the path of movement of the chambers for cutting open the stomachs, and a device for cleaning the stomachs after they have been cut open.

In a known apparatus of the above-described type, the stomachs are fed into the chambers while the chambers are at the upper part of the periphery of the wheel, which rotates in an upright plane. After leaving the feed region, the stomachs are held by a number of spring-loaded pegs, and are conducted past a circular rotary knife for cutting them open. In the feed region, the pegs are pressed back against the action of their springs by a constraining guide. Wash nozzles for cleaning the cut-open stomachs are disposed after the circular knife around the path of rotation of the chambers. Just before the feed region is again reached, the pegs are pulled back by the constraining guide, so that the slit and washed stomachs fall out downwards from the chambers. Such an apparatus is disclosed in U.S. Pat. No. 2,812,540. Such an apparatus does not automatically adapt itself to the wide range of sizes of the stomaches of small animals, even if these are all the stomachs of poultry. Even these can vary widely in size. Very small stomachs are therefore not sufficiently cut open. Large stomachs are frequently excessively cut open. As a result, there is a great deal of wastage. It is also necessary, in this known and other known apparatus, to incorporate after the apparatus, a further operation, by which horny skin is peeled out from the interior of the stomach.

The object of the present invention is to provide an apparatus of the type initially described which will process different sized stomachs of small animals reliably and without notable loss.

To this end, according to this invention, we provide apparatus for cutting open and cleaning the stomachs of small animals, the apparatus comprising a conveying wheel, which has around its periphery chambers for holding the stomachs, means for feeding the stomachs to the chambers, a knife which extends into the path of movement of the chambers for cutting open the stomachs and a device for cleaning the stomachs after they have been cut open, wherein the wheel includes means for decreasing and increasing the sizes of the chambers as the wheel rotates, the chambers decreasing in size as they move away from the feeding means towards the knife, and divider means is provided for prizing open the stomachs and removing hard skin from within the stomachs, the divider means being situated on the side of the knife remote from the feeding means considered in the direction of rotation of the wheel.

With this apparatus, the stomachs fed into the chambers, preferably in the upper part of the wheel which is preferably rotated in an upright plane, are flattened after being fed in. This ensures that the knife always cuts open the stomachs to a uniform depth independently of the size of each particular stomach. The divider means opens out the stomachs, that is it prizes them open and substantially removes the hard internal skin, so that generally further processing by means of a peeler roll is no longer necessary or at any rate needs to be carried out only to a very limited extent.

Preferably, the wheel comprises three discs arranged face to face and driven at the same speed, the axis of rotation of the middle disc being eccentric to the common axis of rotation of the two outer discs and further comprising a wall which bounds the chambers around the peripheries of the outer discs between the feeding means and the divider means, the wall being concentric with the outer discs and the knife extending through a slit in the wall into the chambers.

This construction represents one way of providing the constrained reduction in size of the chambers from the feeding means to the knife. If the eccentricity of the axis of rotation of the middle disc is downwards, then the cleaning of the cut-open stomachs is carried out in the lower region of the wheel. That is to say the openings in the stomachs are directed downwards, so that the contents of the stomach and the removed parts of the hard skin fall out under gravity.

The knife is with advantage a circular rotary knife driven counter to the direction of conveyance of the conveying wheel.

A rotary stomach cleaning brush may be provided following the divider means. The brush is preferably driven in a direction such that its periphery adjacent the wheel moves in the same direction as the periphery of the wheel and at a higher peripheral speed than the conveying wheel.

Two examples of apparatus in accordance with the invention are illustrated in the accompanying drawings, in which.

Figure 1:
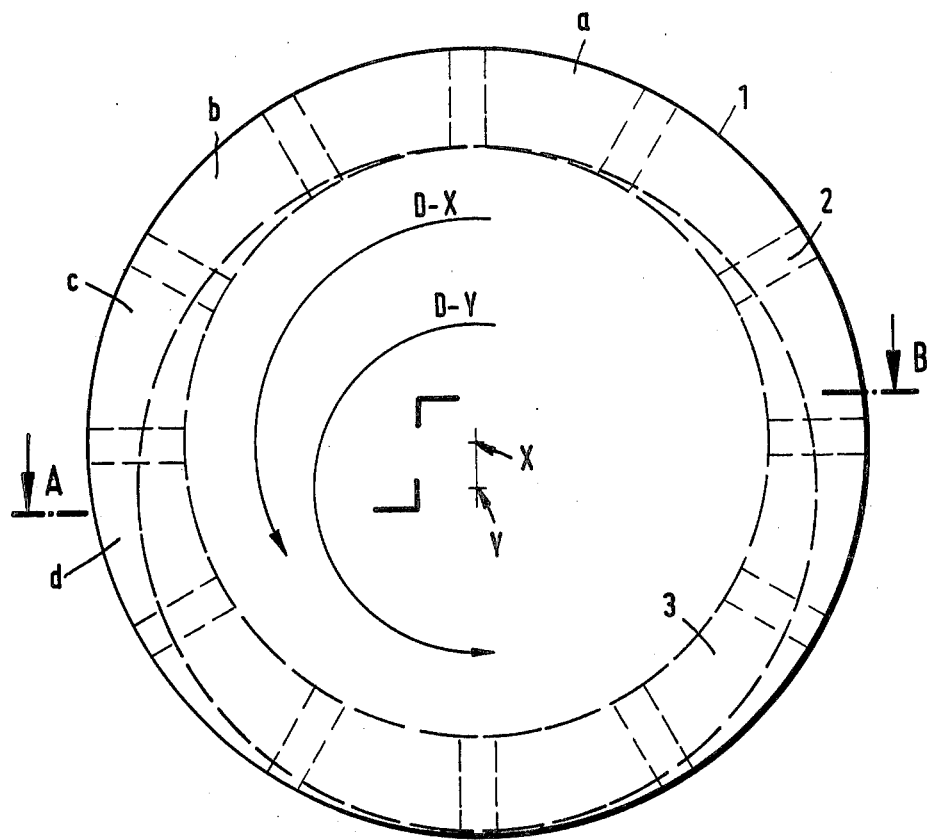
FIG. 1 is a diagrammatic side view of the conveying wheel of both examples for the purpose of explaining the basic principles of the apparatus.
Figure 2:
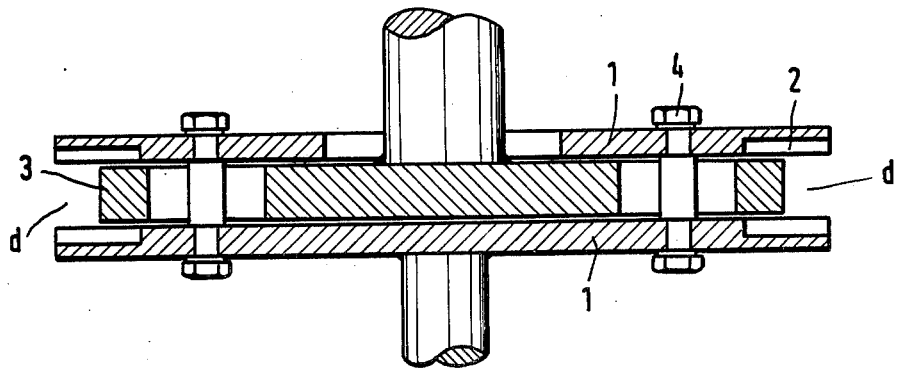
FIG. 2 is a section along the line A–B of FIG. 1.

The wheel shown in FIGS. 1 and 2 of the drawings comprises two outer discs 1 with entraining devices 2 formed on the inner sides. The two discs 1 are connected together by bolts 4. The common axis of rotation of the two discs 1 is referenced X. Between these two outer discs 1 there is a central disc 3, the axis of rotation of which is referenced Y. The thickness of the central disc 3 determines amongst other things the size of chambers formed between the peripheries of the discs 1.

All the discs are driven at the same speed and in the same direction as indicated by the arrows DX and DY so that the following conditions arise, considered in respect of FIG. 1.

Figure 3:
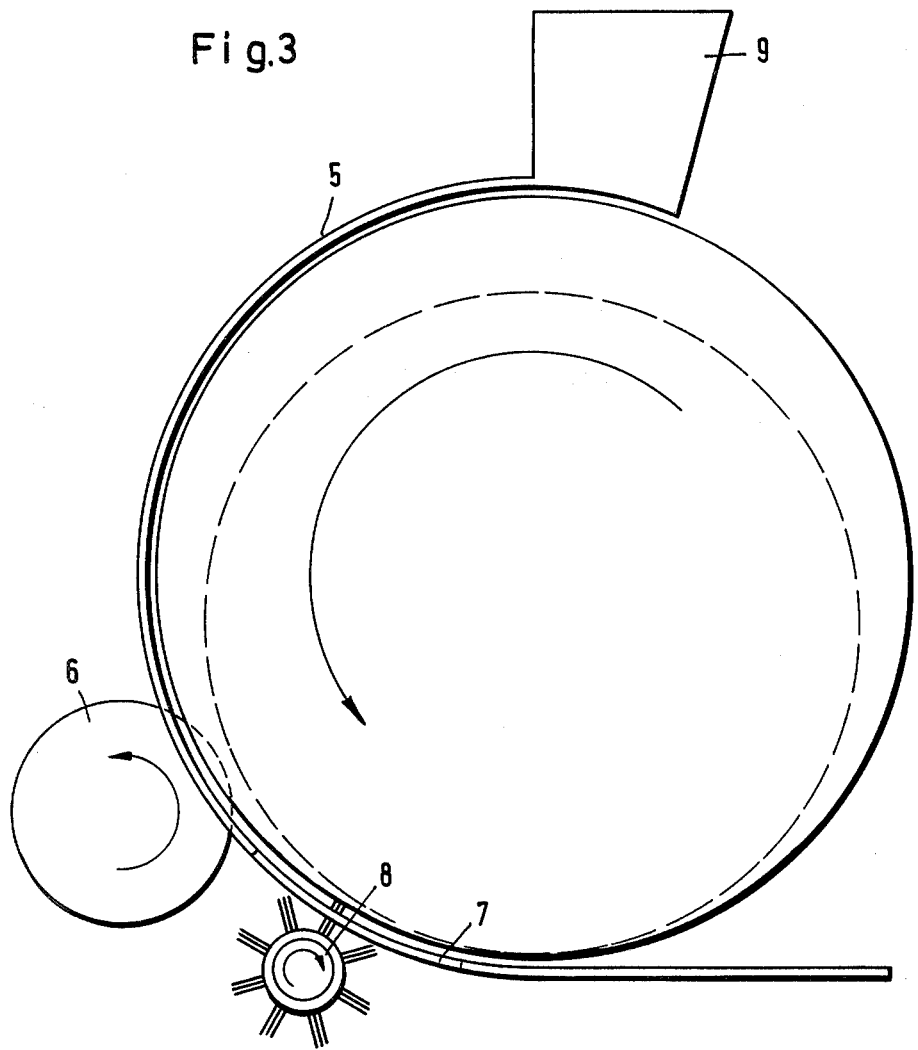
FIG. 3 is a side view of a first example of the apparatus.
Figure 4:
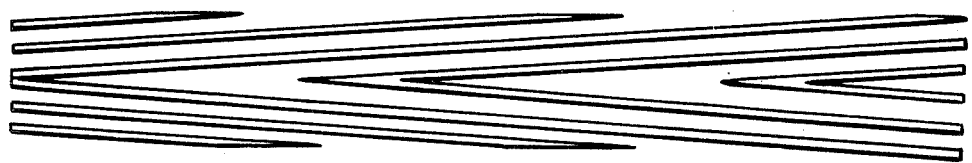
FIG. 4 is a plan on an example of a divider forming part of the first example for prizing open the stomachs of the small animals, shown in developed view; and, FIG. 5 is a side view of a second example of the apparatus.

At point a, the chamber defined by the three discs 1 and 3 and the adjacent entraining devices 2 is at its largest. The supply of the small animal stomachs takes place in this region by a feeder 9 shown in FIG. 3. After passing through the regions b and c, where the chambers gradually decrease in size, the small animal stomachs are pressed into a uniform shape, determined by an externally situated wall 5 (FIG. 3). In region d, the wall 5 has a slit, through which a revolving circular knife 6 penetrates into the chamber and cuts open the stomach situated therein, always to the same depth of cut. After the region d, the wall 5 is so constructed that a divider 7 (shown in developed form in FIG. 4) comes into action. In the example of FIGS. 1 to 4, the divider 7 is suitably profiled or is equipped with a plurality of radiating knife parts, situated alongside one another. This divider prizes apart the already cut stomachs. Simultaneously, the contents of the stomach fall out substantially of their own accord and the internally situated hard skin is drawn away from the stomach as a result of the form of the divider 7. Also situated in this region is a hard brush 8. The brush 8 is rotated so that its periphery moves in the same direction as the periphery of the wheel but at a higher speed. This carries out the remainder of the cleaning and an additional transportation of the small animal stomachs. The stomachs now emerge from the chambers and run over a checking conveyor belt similar to that in the example of FIG. 5. A small number of the stomachs may, as desired, be additionally cleaned out by a peeler roll of conventional construction (not shown).

Figure 5:
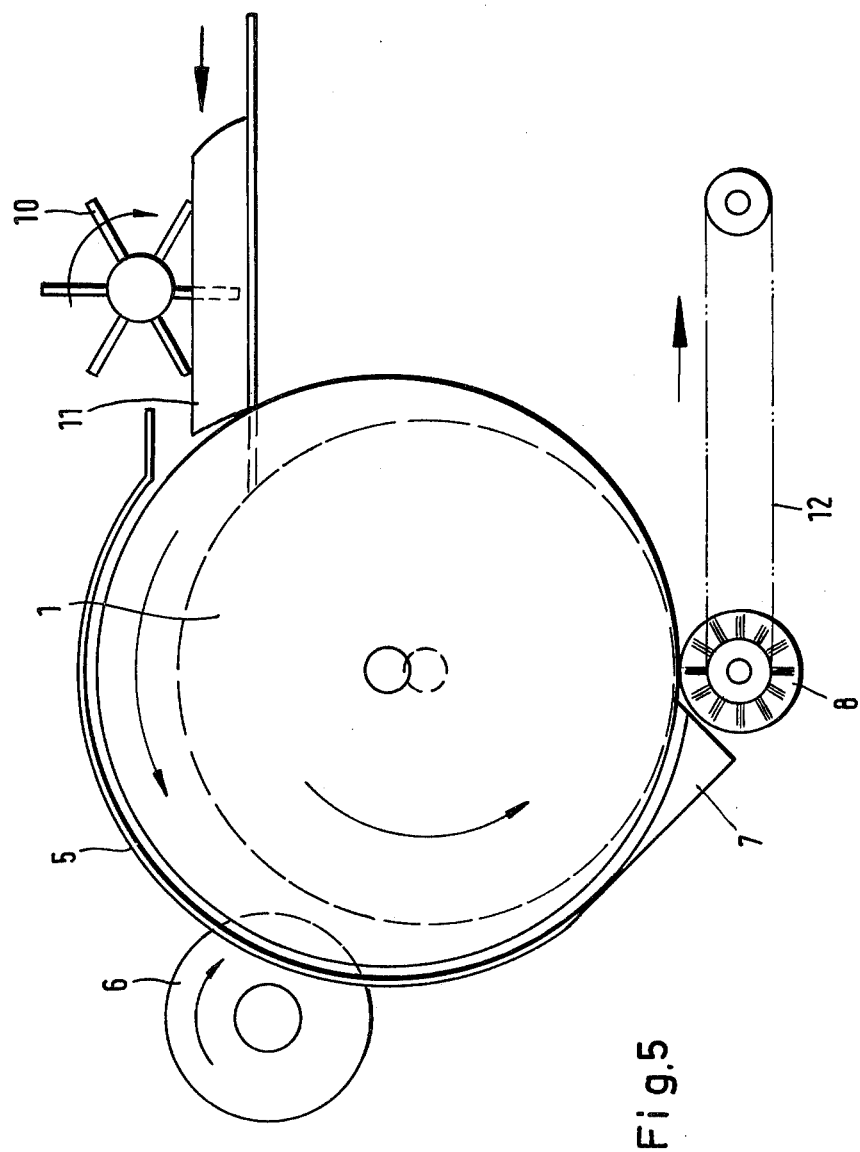

The example of FIG. 5 differs from that of FIGS. 1 to 4 in that the supply of stomachs takes place just before the uppermost point of the wheel is reached. For this purpose, a pushing-in device 10 with a channel 11 is provided. The divider is constructed somewhat differently from that of FIG. 4. In addition, a checking conveyor belt 12 is shown. This may have a common drive with the brush 8.

What I claim is:

1. In apparatus for cutting open and cleaning the stomachs of small animals, said apparatus comprising a conveying wheel, means for driving said conveying wheel, means defining a plurality of chambers for holding said stomachs around the periphery of said conveying wheel, means for feeding said stomachs to said chambers, a knife, means supporting said knife in a position in which said knife extends into the path of movement of said chambers, whereby said knife cuts open stomachs in said chambers, and a device for cleaning said stomachs after they have been cut open by said knife, the improvement wherein said wheel includes means for decreasing and increasing the sizes of said chambers as said wheel rotates, and wherein divider means is provided for prizing open said stomachs and removing hard skin from within said stomachs, said divider means including means mounting said divider means on the side of said knife remote from said feeding means considered in the direction of movement of said chambers.

2. Apparatus as claimed in claim 1, wherein said wheel includes three discs, means rotatably mounting said discs face to face to form a middle disc and two outer discs, said driving means being adapted to rotate said discs at the same speed as each other, means rotatably mounting said outer discs for rotation about a common axis, means mounting said middle disc for rotation about an axis eccentric to said common axis, wall means bounding said chambers around the peripheries of said outer discs between said feeding means and said divider means, said wall being concentric with said outer discs, and means defining a slit in said wall, said knife extending through said slit into said chambers.

3. Apparatus as claimed in claim 2, wherein said discs are mounted for rotation in upright planes and said axis of rotation of said middle disc is below said common axis of rotation of said outer discs.

4. Apparatus as claimed in claim 1, wherein said knife is circular, and further comprising means for rotating said circular knife whereby the periphery of said knife moves counter to the direction of movement of said chambers.

5. Apparatus as claimed in claim 1, further comprising a stomach cleaning brush and means mounting said stomach cleaning brush adjacent said divider means and on the side of said divider means remote from said knife considered in the direction of movement of said chambers.

6. Apparatus as claimed in claim 5, further comprising means rotatably mounting said brush and means for driving said brush in a direction such that the periphery of said brush adjacent said wheel moves in the same direction as said chambers.

7. Apparatus as claimed in claim 6, wherein said means for driving said brush is adapted to drive said brush at a higher peripheral speed than the peripheral speed of said conveying wheel.

* * * * *